April 15, 1952 G. C. SZIKLAI 2,593,395
HIGH-FREQUENCY AMPLITUDE MODULATED TRANSMITTER
Filed March 17, 1950
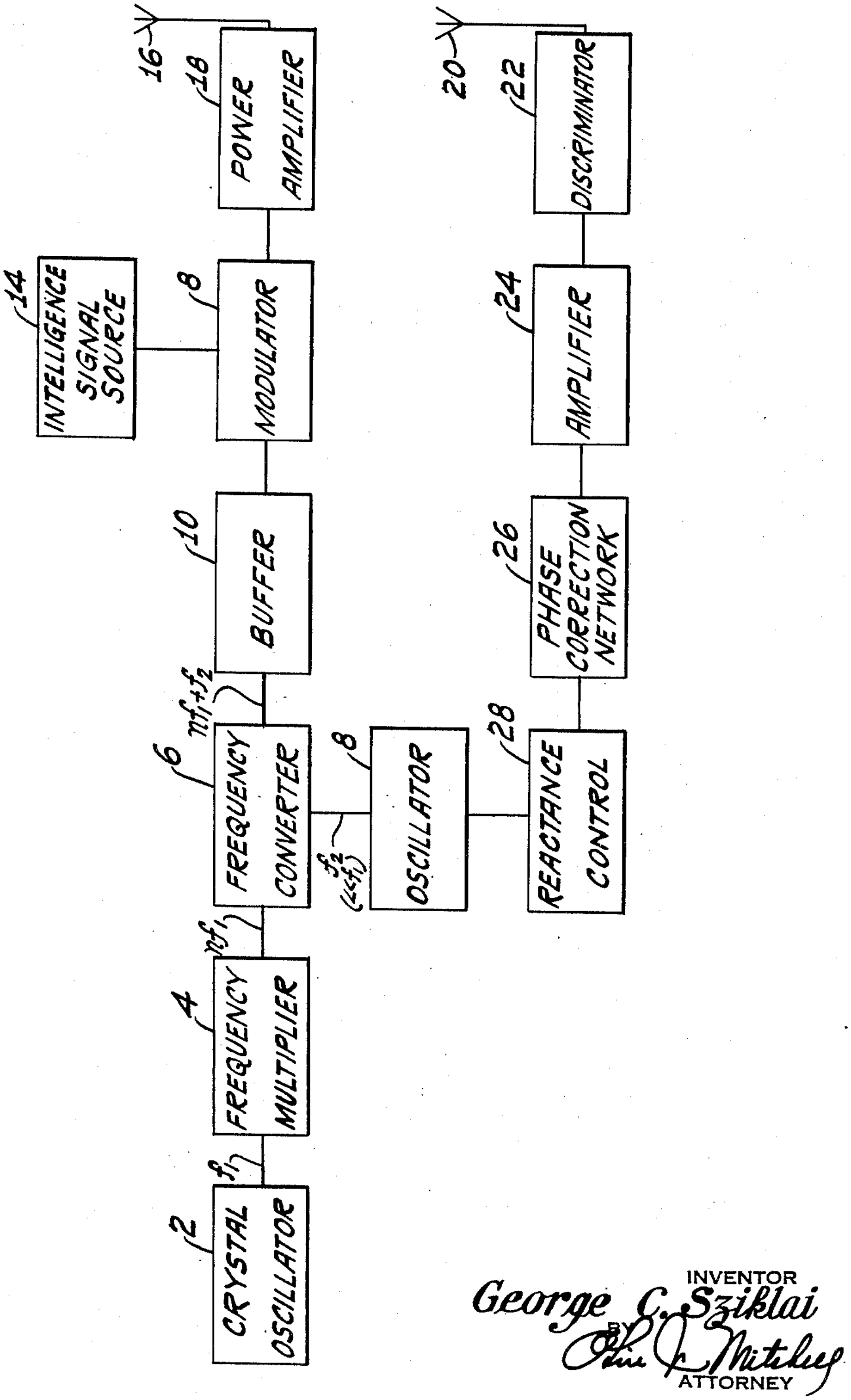
INVENTOR
George C. Sziklai
BY
ATTORNEY Patented Apr. 15, 1952 2,593,395

UNITED STATES PATENT OFFICE 2,593,395

HIGH-FREQUENCY AMPLITUDE MODULATED TRANSMITTER

George C. Sziklai, Princeton, N. J., assignor to Radio Corporation of America, a corporation of Delaware Application March 17, 1950, Serial No. 150,323

5 Claims. (Cl. 332—38)

This invention relates to apparatus for preventing a change in the frequency of a transmitter in the presence of amplitude modulation.

It is well known that amplitude modulation produces changes in frequency of the carrier wave of a transmitter. Whereas these changes in frequency are comparatively small and unimportant in many applications, they are of extreme importance in others. For example, where high frequency carriers are employed the transmission path followed by the radio frequency energy may vary in accordance with its frequency. This may produce undesirable phase changes in the received intelligence.

The necessity for an extremely stable carrier frequency is even greater in intercarrier sound television receivers. Present standards provide for a first carrier that is amplitude modulated with the video intelligence and a second carrier that is frequency modulated with the audio intelligence. The latter is, in accordance with the present television standards, 4.5 mc. above the former. In intercarrier sound receivers the beat note between the two carriers is employed to derive the audio intelligence. Therefore, it is clear that any frequency modulation induced into the video carrier by the video signals will deteriorate the audio signal.

In the prior art, provisions have been made for stabilizing the frequency of an amplitude modulated carrier in accordance with the signal that is actually transmitted. In most of these arrangements, however, the frequency correction circuit has been connected directly to the oscillator from which the carrier frequency is derived. This means that slow variations in the correction circuit itself, due to temperature changes and other causes, produce changes of the same percentage in the carrier frequency, and thus it may produce greater frequency instability than if no frequency controlling means were used at all.

In accordance with this invention, however, slow variations in frequency produced by a drift in the frequency correction circuits is minimized. Briefly, this is accomplished as follows. The carrier frequency is derived from the beat frequency between two voltage waves that are, in turn, derived from two separate oscillators. Ordinarily, the carrier frequency is derived from a single oscillator. One of the voltage waves has a frequency that is small in comparison with the other. The frequency control network is applied to the oscillator from which the lower frequency is derived. Drifts in the frequency correction network therefore have a smaller percentage effect on the carrier produced than if the control network were applied to a base oscillator as in the prior art.

Accordingly, it is an object of this invention to provide an improved means for correcting the frequency modulation produced in a carrier by amplitude modulation. This is done in such a way that discrepancies inherent in the frequency correction network itself are minimized.

Other advantages will become apparent from the consideration of the drawing illustrating by block diagram one form of this invention.

The frequency of the voltage waves provided by a crystal oscillator 2 is multiplied by a frequency multiplier 4. The voltage waves thus derived are applied to a frequency converter 6. A second oscillator 8 is also connected to the frequency converter 6 and the carrier frequency is created by the heterodyning action taking place therein. This carrier frequency is supplied via a buffer stage 10 to a modulator 8 wherein it is amplitude modulated in accordance with the intelligence signal supplied by a source 14. The output of the modulator 8 is applied to an antenna 16 via a power amplifier 18 in accordance with known practice.

The modulated carrier thus developed may be picked up by an antenna 20 and supplied to a tuned frequency discriminator 22.

As an alternative, the input of the discriminator may be coupled or connected to the output of the modulator 8 in any known fashion.

After passing through an amplifier 24 the varying D. C. signal provided by the discriminator 22 is passed through a phase correction network 26. The phase of the control voltage wave supplied by the discriminator can thus be adjusted so that oscillations will not be set up. The output of the phase correction network 26 is applied to a reactance control 28 which may be a reactance tube or any suitable means for changing the frequency of the oscillator 8. Details of a discriminator and other components discussed above can be found in my U. S. Patent 2,273,110 issued on February 17, 1942.

The advantages to be derived from such a circuit as described above can best be illustrated by the following example. Assuming that the output of the crystal oscillator 2 is 10 mc., it can be multiplied by 48 in the frequency multiplier 4 so as to present a 480 mc. signal to the frequency converter 6. If the output of the oscillator 8 has a frequency of 20 mc. and the sum frequency is selected in the frequency converter 6, the carrier frequency thus created will be 500 mc. If any change in the characteristics in the network controlling the frequency of oscillator 8 takes place, the number of cycles changed in a 500 mc. carrier will be reduced by a factor of 500 divided by 20 which equals 25. In other words, if the control signal of the reactance tube 28 were applied directly to control the frequency of the crystal oscillator 2 in accordance with the prior art, a similar drift in carrier frequency would produce one twenty-fifth as much control.

In other types of transmitters the major portion of the carrier frequency may be derived in a different manner from that shown. Instead of employing a crystal oscillator 2 and a frequency multiplier 4, magnetrons or other types of high frequency oscillators may be employed. It sometimes becomes difficult to control the frequency of such oscillators. In such a case, the arrangements shown and described may be of considerable advantage.

What is claimed is:

1. A transmitter comprising in combination a first source of voltage waves of a given frequency, a second source of voltage waves of a much lower frequency than said given frequency, a frequency converter connected so as to receive the outputs of said first and second sources, a modulator to which the output of said frequency converter is applied, a source of intelligence bearing signals also connected to said modulator, means for transmitting the modulated wave thus formed, a tuned discriminator energized by a portion of said modulated wave, and means for controlling the frequency of said second source by the output of said discriminator.

2. A transmitter such as described in claim 1 in which the means for controlling the frequency of said second source includes a phase correction network.

3. An apparatus for controlling the frequency of a modulated signal comprising in combination a first oscillator, a second oscillator, a frequency converter, means for applying voltage waves derived from said oscillators to said converter to provide a beat frequency carrier wave, a source of signals, a modulator to which the carrier wave output of said converter and signals from said source are applied, a frequency discriminator, means for applying a portion of the output of said modulator to said discriminator, and means for controlling the frequency of said first oscillator by the output of said discriminator.

4. Apparatus as described in claim 3 wherein the frequency of the voltage wave derived from said second oscillator is substantially greater than the frequency of the voltage wave derived from said first oscillator.

5. A transmitter comprising in combination a first stabilized source of voltage waves of a given frequency, a second source of voltage waves of a much lower frequency than said given frequency, a frequency converter connected so as to receive the outputs of said first and second sources, a modulator to which the output of said frequency converter is applied, means for modulating the amplitude of the waves applied to said modulator in accordance with signal intelligence, means for transmitting the modulated wave thus formed, a tuned discriminator energized by a portion of said modulated wave, and means for controlling the frequency of said second source by the output of said discriminator.

GEORGE C. SZIKLAI.

REFERENCES CITED

The following references are of record in the file of this patent:

UNITED STATES PATENTS

| Number | Name | Date |
|---|---|---|
| 2,176,587 | Goldstine | Oct. 17, 1939 |
| 2,456,763 | Ziegler | Dec. 21, 1948 |
| 2,501,368 | White | Mar. 21, 1950 |